Figure 1:
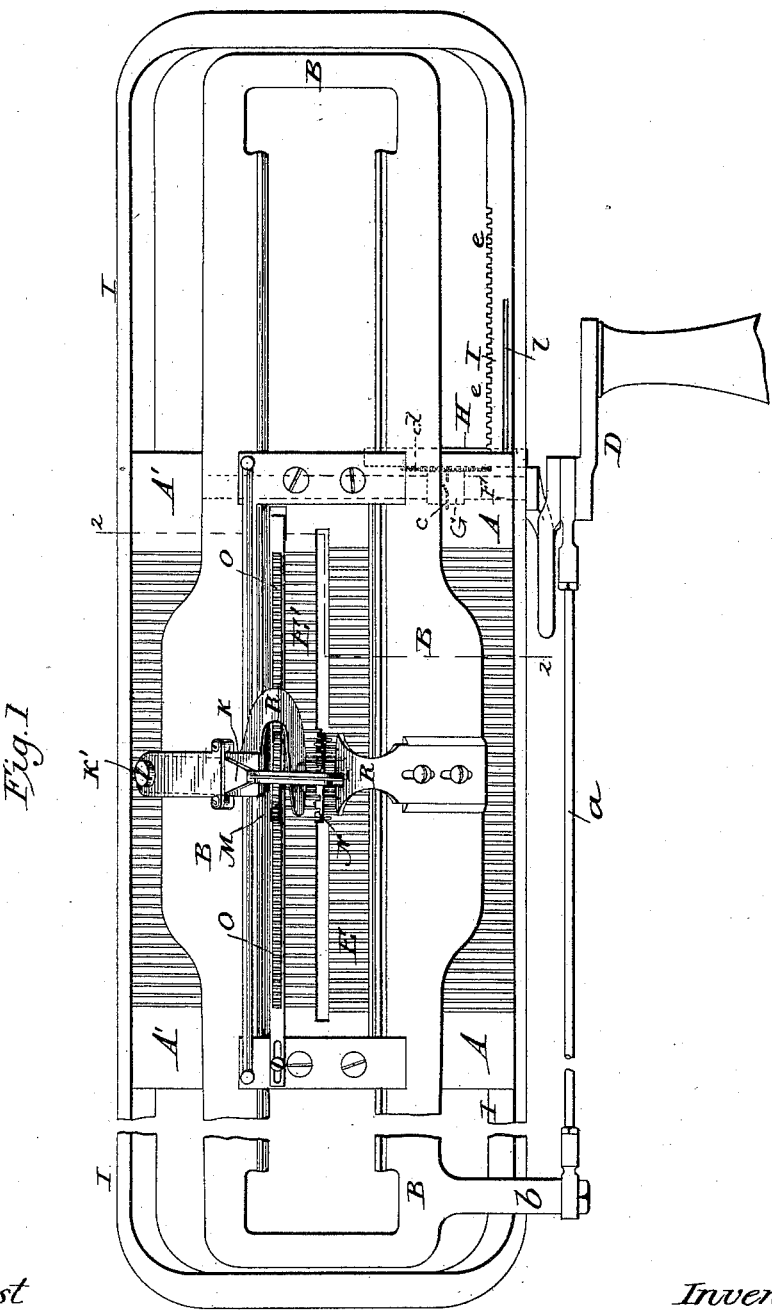

(No Model.)

5 Sheets—Sheet 1.

S. B. & F. F. LEWIS.
STRAIGHT KNITTING MACHINE.

No. 466,853.

Patented Jan. 12, 1892.

Attest
Sidney P. Hollingsworth
James F. Duhamel

Inventors.
STEPHEN B. LEWIS
FRANKLIN F. LEWIS
by their attorneys,
Dodge Sons.

(No Model.) 5 Sheets—Sheet 2.
S. B. & F. F. LEWIS.
STRAIGHT KNITTING MACHINE.
No. 466,853. Patented Jan. 12, 1892.
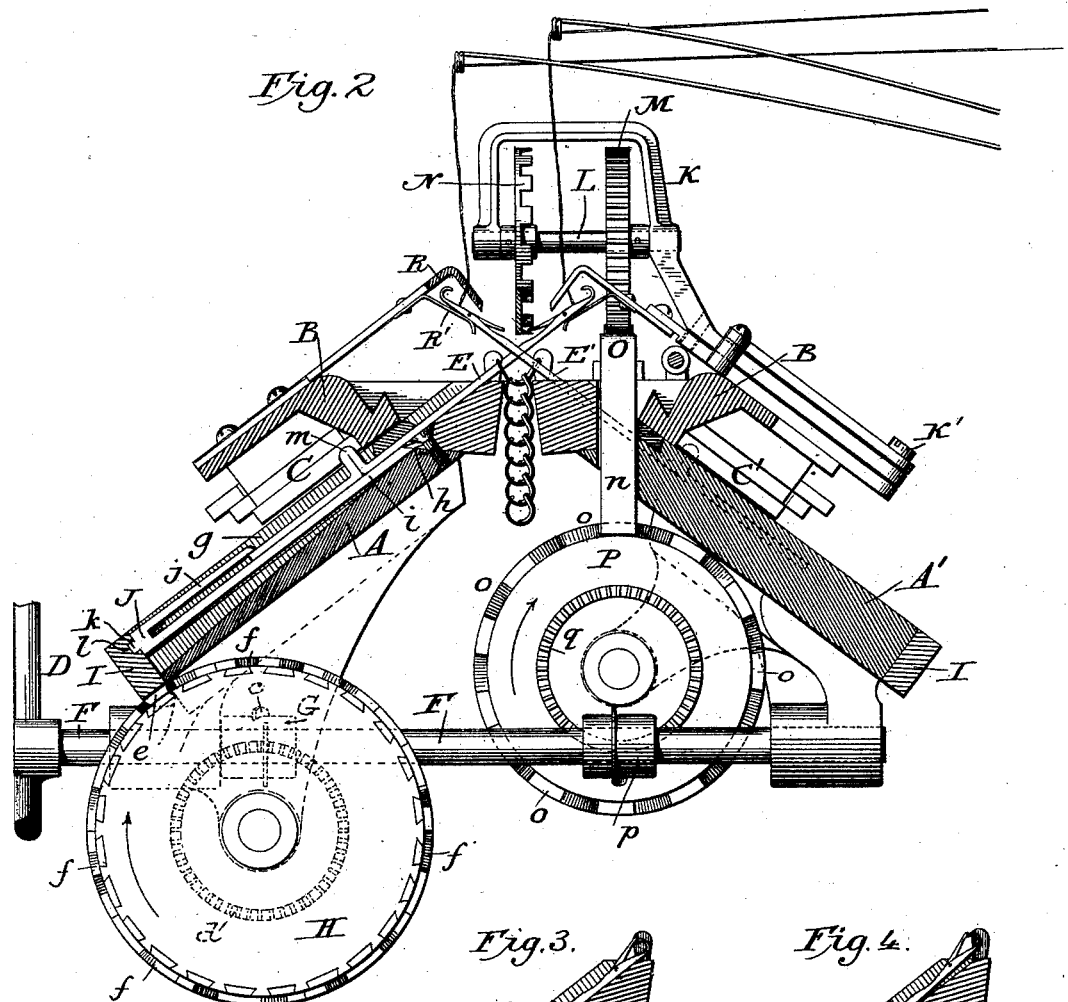
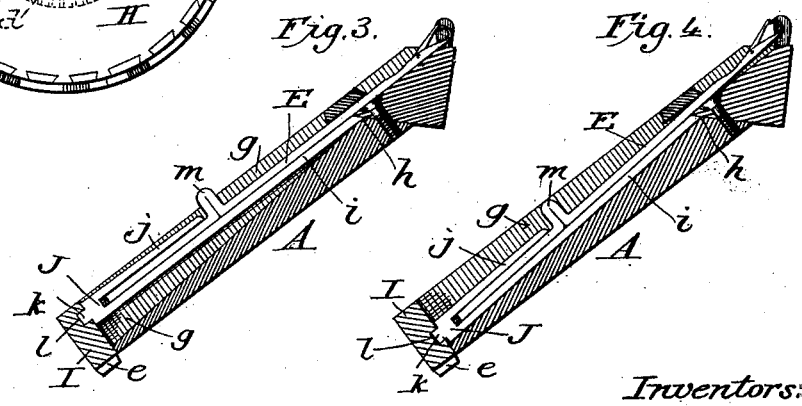
Attest:
Sidney P. Hollingsworth
James F. Duhamel
Inventors:
Stephen B. Lewis
Franklin F. Lewis
by their attorneys
Dodge & Sons (No Model.) 5 Sheets—Sheet 3.
S. B. & F. F. LEWIS.
STRAIGHT KNITTING MACHINE.
No. 466,853. Patented Jan. 12, 1892.
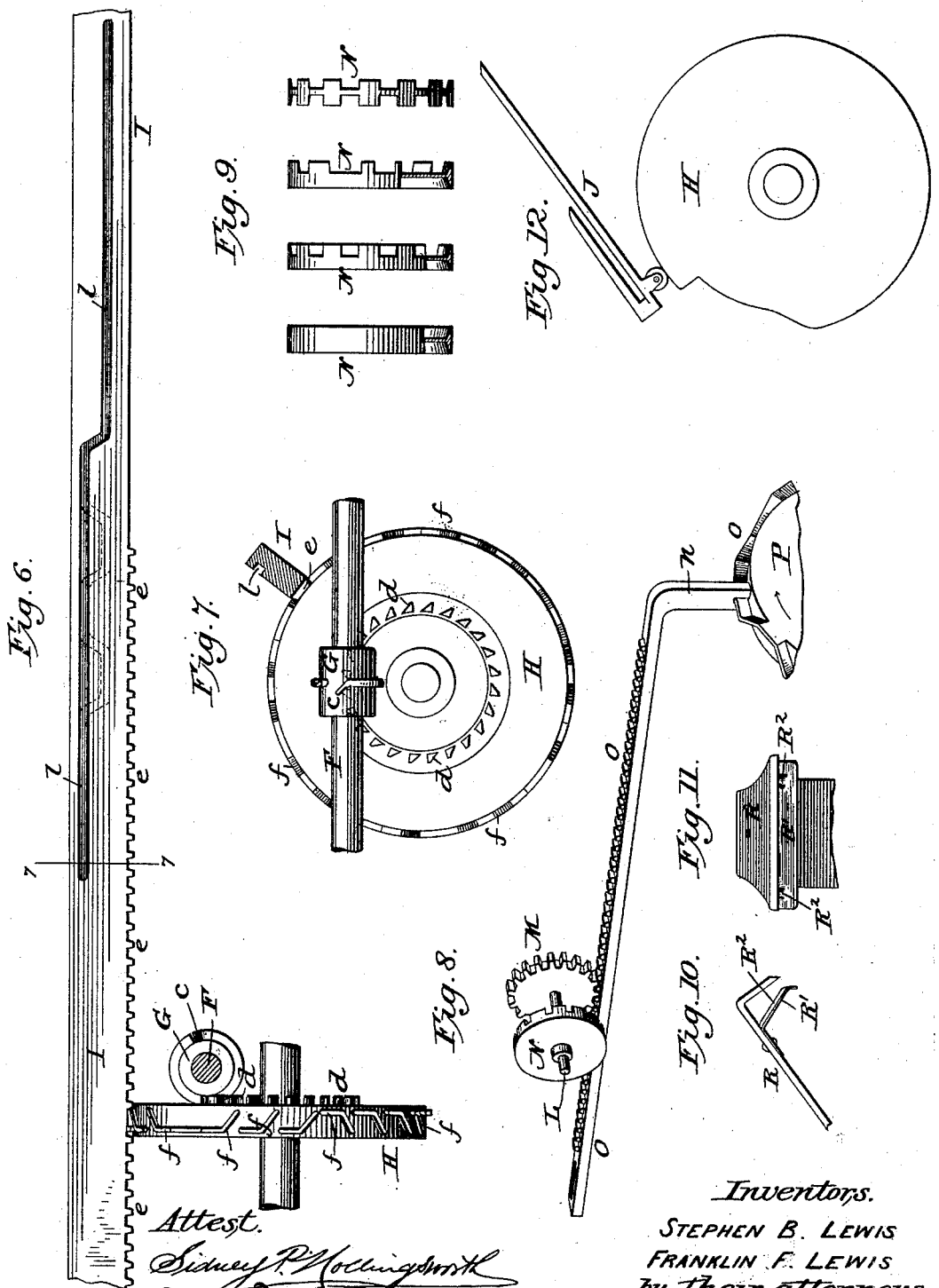
Attest.
Sidney P. Hollingsworth
James F. Duhamel.
Inventors.
STEPHEN B. LEWIS
FRANKLIN F. LEWIS
by their attorneys
Dodge & Sons (No Model.) 5 Sheets—Sheet 4.
S. B. & F. F. LEWIS.
STRAIGHT KNITTING MACHINE.
No. 466,853. Patented Jan. 12, 1892.
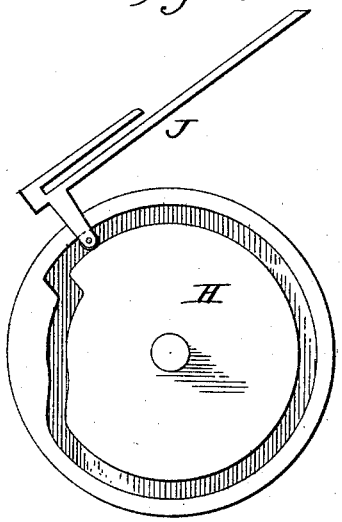
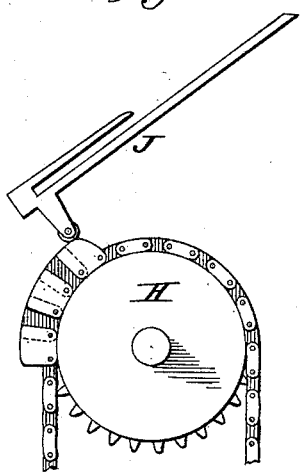
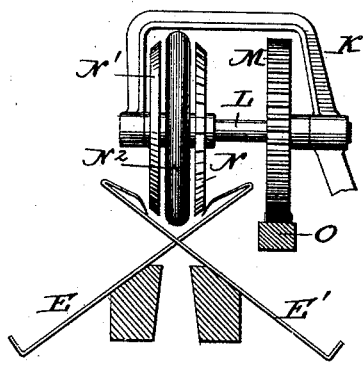
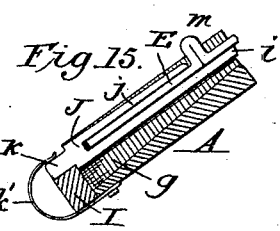
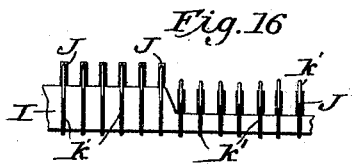
Attest.
Inventors
STEPHEN B. LEWIS
FRANKLIN F. LEWIS
by their attorneys (No Model.)  S. B. & F. F. LEWIS.  5 Sheets—Sheet 5.
STRAIGHT KNITTING MACHINE.
No. 466,853.  Patented Jan. 12, 1892.
*Fig. 18.*
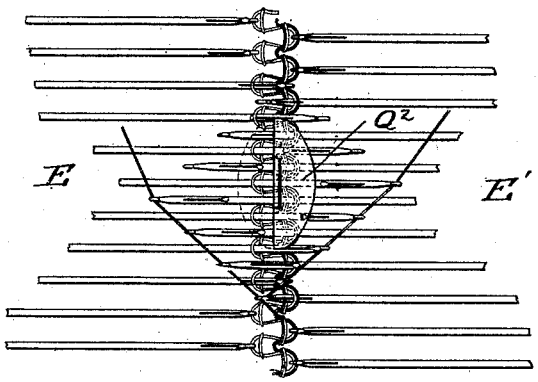
*Fig. 19.*  *Fig. 20.*
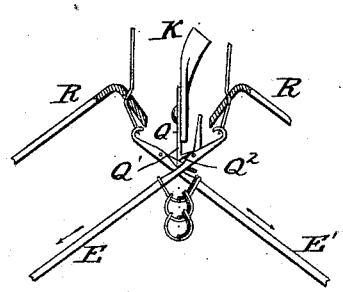  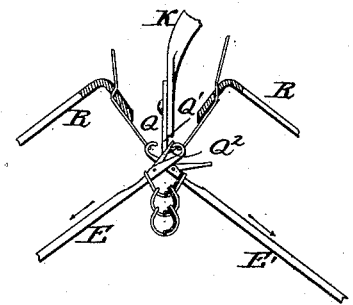
*Fig. 21.*  *Fig. 22.*  *Fig. 23.*
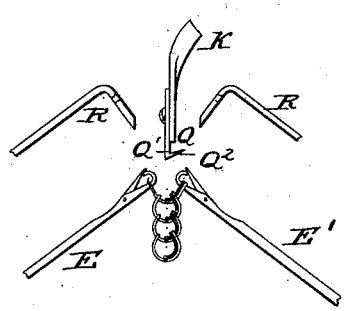  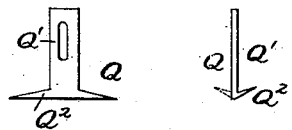
*Fig. 24.*
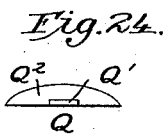
Attest.  Inventors.
Sidney P. Hollingsworth  STEPHEN B. LEWIS
James F. Duhamel  FRANKLIN F. LEWIS
  by their attorneys
  Dodge & Sons

UNITED STATES PATENT OFFICE.

STEPHEN B. LEWIS AND FRANKLIN F. LEWIS, OF JANESVILLE, WISCONSIN.

STRAIGHT-KNITTING MACHINE.

SPECIFICATION forming part of Letters Patent No. 466,853, dated January 12, 1892.

Application filed November 18, 1890. Serial No. 371,882. (No model.)

*To all whom it may concern:*

Be it known that we, STEPHEN B. LEWIS and FRANKLIN F. LEWIS, citizens of the United States, residing at Janesville, in the county of Rock and State of Wisconsin, have invented certain new and useful Improvements in Straight-Knitting Machines, of which the following is a specification.

Our invention relates to knitting-machines, straight or circular, having two rows of latch or spring needles placed at an angle to each other and employing two or more yarns for producing what is known in the art as "double-ribbed" or "two-faced" fabrics.

The objects of our invention are to produce a ribbed fabric formed by the combination of two yarns, one of which is knit into loops on both sides of the fabric, while the other is knit into one side only.

The invention consists, primarily, in means for automatically throwing the needles into and out of engagement with the operating-cams to produce the fabric above mentioned; secondly, in means for closing the latches or the spring-hooks of the needles, and, thirdly, in various other features and details, all as hereinafter more fully set forth and claimed.

In the drawings, Figure 1 is a top plan view of a straight-knitting machine with our improvements applied thereto; Fig. 2, a vertical transverse sectional view of the same on the line 2 2; Figs. 3 and 4, sectional views of the needle-carrying plates, showing the needles in different positions; Fig. 5, a perspective view of the needle-holder; Fig. 6, a view illustrating the mechanism for reciprocating the cam-bar for raising and lowering the needles; Fig. 7, a sectional view of the same on the line 7 7; Fig. 8, a perspective view illustrating the mechanism for closing the latches or hooks of the needles; Fig. 9, a view illustrating various forms of the preferred construction of latch-closer; Figs. 10 and 11, views illustrating a modification in the construction of the latch or hook opener; Figs. 12 to 16, views illustrating modifications of the devices for actuating the needle-holders; Fig. 17, a view illustrating a further modification, showing the use of spring-hook-closing devices; Figs. 18, 19, 20, and 21, views illustrating the operation of the non-rotating latch-closer; Figs. 22, 23, and 24, side, edge, and plan views of the closer shown in Figs. 18 to 21.

A A' represent a part of the stationary frame of the machine, consisting of two flat inclined plates standing nearly at right angles to each other, provided on their upper faces with grooves $g$ to receive the needles and on their lower faces with suitable brackets or hangers to support the operating or driving mechanism.

Suitably supported above the frame A A' is a movable frame B, carrying on its under side the needle-cams C C', said frame B and the parts carried thereby being reciprocated to and fro by means of a hand-lever or crank D through the medium of a connecting-rod $a$, secured at one end to said crank and at the other end to a stud or finger $b$ of frame B.

E E' indicate two rows of needles mounted in the slots $g$ in the upper faces of the plates A A' and actuated by means of the cams C C' in the usual manner, the needles crossing each other in their movement and forming the double-ribbed fabric. So far the construction described is that ordinarily employed in machines of this general character using two rows of needles.

F indicates a shaft journaled in brackets on the under side of the stationary main frame and bearing on its outer end the crank D, by means of which rotary motion is imparted to said shaft. Secured to shaft F is a sleeve or collar G, having a peripheral inclined projection $c$ to engage the teeth of a gear-wheel $d$, projecting from the face of a cam-wheel H, as shown in Figs. 2, 6, and 7, the construction of these parts being such that at each revolution or rotation of the shaft corresponding to one to-and-fro movement of frame B and two stitches the wheels $d$ and H will be turned or moved a distance equal to the width of one of the teeth of wheel $d$.

I indicates an elongated frame surrounding the machine and bearing closely against the lower edges of the plates or frame A A', but moving freely backward and forward in a longitudinal direction. This frame is of such length as to allow it to move a distance twice as great as the length of a row of needles. On the lower edge of the frame, on one side, we form teeth $e$, equal in number to the gage of the machine—that is to say, there are as many teeth to the inch as there are needles to the inch—the said teeth being designed to engage or be engaged by a peripheral cam or cams $f$ on the wheel H, as shown in Figs. 2, 6, and 7. The cams $f$ are of such length and are placed on the periphery of wheel H in such position that they will, when the said wheel H is moved, engage and move the bar or frame I a distance equal to the width of one tooth $e$ either to the right or to the left, according to the inclination or position of the cams, motion being imparted to the wheel H by means of the collar or sleeve G on shaft F, as before explained.

If it is desired to have the bar or frame I remain stationary, the cams or wings $f$ are so placed as to pass between the teeth $e$ without acting upon them. These peripheral cams or wings $f$ are preferably made detachable, (preferably by seating them in dovetail transverse grooves, Fig. 2,) so that their arrangement may be altered, thereby allowing one or more cams with the same inclination to be placed in succession and giving a more or less extended movement to frame or bar I, or a longer period of rest, as may be desired. Cams or wings $f$ are equal in number to the teeth of gear $d$, so that at each complete rotation of shaft F the wheel H will be moved and a new cam or wing brought into engagement with the bar or frame I, the movement of the latter depending, of course, upon the formation of the cams successively brought into engagement therewith.

Ordinarily the grooves made to receive the needles are deep enough to allow the upper edge of the body of the needles to be below the surface of the plate; but in our machine we make the slots $g$ of greater depth at the lower or outer end, where the frame or bar I bears, said slots decreasing in depth toward their upper ends, where a shoulder $h$ is formed, as shown in Figs. 2, 3, and 4.

J indicates a needle holder or fork of the same width as the needle, comprising two parallel fingers $i\ j$ and a rearwardly-projecting stud $k$, as shown in Fig. 5. The fingers $i\ j$ are separated from each other to receive the body of the needle, and each needle, with its fork or holder J, is placed into its particular slot $g$, the end of finger $i$ engaging the shoulder $h$ and the stud $k$ entering the cam-groove or slot $l$ in the frame or bar I, as shown in Figs. 2, 3, and 4. When in operative position, as shown in Figs. 2 and 3, the shanks $m$ of the needles project above the surface of the plate in position to be acted upon by the needle-cams C C'; but when depressed, as shown in Fig. 4, the shanks $m$ sink below the surface of the needle-plate and out of the path of the needle-cams. This raising and lowering of the needles is effected by the reciprocation of the bar or frame I, whose slot $l$ receives the studs of the needle-holders. Upon reference to Fig. 6 it will be seen that this slot $l$ is of irregular form—that is to say, there is first a straight portion, then a downwardly-inclined portion, and then a straight portion. The two straight portions are a distance apart vertically equal to the distance traveled by the holder or fork J in carrying the shank $m$ below the surface of the plate out of the path of the needle-cams, while the distance between the highest and lowest parts of the inclined portions is equal to the distance between two needles.

From the foregoing it will be seen that every step-by-step movement of the bar or frame I to the right or left causes a needle to rise into operative position or to be lowered to an inoperative point. It is of course to be understood that both sets of needles E and E' are operated simultaneously by the reciprocation of the frame or bar I, (there being a slot $l$ in the inner face of each of the side bars of frame I;) but instead of making the frame continuous the bars acting upon the respective sets of needles may be separate and each adapted to be actuated by its own cam-wheel. This arrangement involves merely a duplication of the cam-wheel H, and we therefore do not deem it necessary to illustrate such plan. Again, instead of grooving the bar or frame I to receive the studs $k$ of the holders or forks the latter may rest upon the upper face of the bar, as shown in Figs. 15 and 16, springs $k'$ being used in such arrangement to depress the needles; and, again, instead of using a reciprocating bar or frame I each needle may be acted upon by its own cam-disk, as shown in Figs. 12 and 13, or by a pattern-chain, as in Fig. 14, motion being imparted to the shaft carrying these parts by means of an intermittently-acting device, such as shown in Figs. 6 and 7, or any equivalent construction.

Journaled in a suitable bracket K, secured to the reciprocating frame B, is a horizontal shaft L, which is provided with a spur-gear M and a wheel N, with a broad flange, as shown in Figs. 1, 2, and 8, the said gear-wheel meshing with a rack-bar or track O, extending lengthwise of the machine above the needles. This bar O is provided at one end with a depending arm $n$, forked at its lower edge to engage a cam or cams $o$, Fig. 8, on the periphery of a wheel P, which latter is driven by a feathered sleeve $p$, carried by the shaft F and engaging a gear-ring $q$ on wheel P, as shown in Fig. 2. By this arrangement the rack O is caused to move to the right or left or to remain at rest at each rotation of shaft F, according to the form of the cams $o$ on the wheel P, the step-by-step automatic motion thus imparted to the rack being transmitted to the wheels M and N. Any suitable mechanism for imparting motion to the rack-bar may be substituted for the wheel P.

Wheel N is placed above the center of the machine in such position that the latches of the needles will be caught by the flange of the wheel at its lower side and closed over the hooks as the needles descend, a latch of one of the needles being shown in engagement with the flange of wheel N in Fig. 2. One or more yarns are used for each row of needles, each needle taking the yarn through the latch-opener just as it begins its downward movement after reaching its full height. As the needle descends its latch engages the flange of wheel N, which closes it and prevents the needle-hook from taking up the yarn of the opposite side or row.

By preference wheel N is made, as shown in Fig. 2, with the flange on one side only, so that only the needles on one side of the machine will have their latches closed, as described, this arrangement resulting in the production of a fabric with one face made of loops of one yarn only and the other face made of two yarns.

The flange of wheel N is or may be notched to allow certain needles to pass downward without having their latches closed by the wheel and to enable them to take up the thread from the opposite side, thereby forming figures or designs on the face of the fabric. These notches may be placed at regular intervals and made of regular size, or they may be irregular, both as regards position and size. In the first case regular patterns will result and in the second case an irregular design will be formed in the fabric.

Various modifications in the form of the wheel N will readily suggest themselves to those skilled in the art, several such modifications being illustrated in Fig. 9. In this figure the wheel N is shown as provided with two flanges, one flange for each set of needles, one or both or neither of the flanges being notched.

The operation of this part of the machine is as follows: As the frame B travels to and fro, carrying the wheels M and N, the gear M, which is always in engagement with the rack O, is rotated, bringing alternately over the needles the full portions and notches of the wheel N. This causes the wheel N to close the latches of some needles and allow others to pass without closing to engage the thread or yarn of the opposite set of needles. Variety is given to the pattern by the movement of the bar O, as before described, which accelerates or retards the rotation of the wheel N, according to motion imparted to said bar O by means of cam-wheel P.

The traveling latch-closer, instead of being made in the form of a wheel, may be made of a bent plate Q, of the form shown in Figs. 18 to 24, inclusive, the said plate comprising a main slotted arm Q', to be bolted to the bracket K, and a laterally-projecting latch-closing plate or arm $Q^2$ at the lower end of arm Q'. The closing-arm $Q^2$ may project from one or both sides of the arm Q', so as to act upon one or both sets of needles in the same manner, essentially, as the flanged wheel N. The operation of the device is clearly illustrated in Figs. 19, 20, and 21, which show the needles in their different positions.

So far our invention has been described as particularly applicable to that class of machines employing needles having pivoted or hinged latches; but it will be apparent that the invention is susceptible of use in connection with machines employing needles with spring-hooks. We therefore wish it to be understood that where the term "latch" is used we intend thereby to include not only the hinged or pivoted latches, but also the spring-hooks, which are the equivalents of the latches.

Fig. 17 shows one way in which the so-called "latch-closing" mechanism may be applied to machines employing spring-hook needles. The shaft L in this arrangement is provided with a spur-gear M to engage a rack-bar O, a notched disk or wheel N to act upon the hooks of one set of needles, a second disk or wheel N' to act upon the hooks of the opposite set, and a closing wheel or disk $N^2$ to act upon the hooks of both sets of needles. The action under this construction and arrangement is the same as that which takes place under the construction and arrangement shown in Fig. 2, and hence need not be further described.

In order to insure the opening of the latches, we provide the latch-opener R with a spring-plate R', which is set away a distance from the under side of the head of the latch-opener, as shown in Figs. 2, 10, and 11, the said plate being provided with ribs $R^2$ on its upper face, as shown. The object of this plate is to hold the needle up into such position as to insure the engagement of its latch with the head or edge of the opener and prevent the occasional dropping of stitches through the failure of the latch-opener to do its work, as frequently occurs when certain needles are low enough to allow their latch-points to pass under the opener. The needles come into contact with the ribs on the spring-plate, and as the carriage passes along the pressure on the lower side of the needle-head is removed as soon as the point of the hook or needle has passed under the operating edge of the latch-opener, thus obviating side or lateral strain on the needle. The bracket or arm K, carrying the latch or hook closer, is hinged or pivoted at K' to the traveling cam-frame B, so that it may swing laterally a limited distance, in order that it may be held to the backward portion of the needles as actuated by their cams C C', the latch-closing wheel N being of course presented to the returning needles and not the rising needles. This arm or bracket may be merely the yarn-guide or may be separate therefrom, as shown.

No claim is made herein to the fabric itself, as that is embraced in an application filed by us November 11, 1890, Serial No. 371,035.

Having thus described our invention, what we claim is—

1. In combination with slotted plate A, the needle-holders, needles, and needle-actuating cam, a single cam-bar for raising and lowering the needle-holders on one side of the machine, and a pattern-wheel for imparting motion to the cam-bar.

2. In a knitting-machine, the combination, with the needles and their cams C C', of mechanism for automatically raising the needles into and out of position to be acted upon by their cams, and a latch-closing device carried by the cam-frame, means for automatically operating the latch-closer and for imparting motion to the cam-frame, and the needle raising and lowering devices.

3. In a knitting-machine, the combination, with the needles and forks and their actuating-cams, of a reciprocating bar or frame I for raising and lowering the needles into and out of operative position, a cam-wheel for imparting a step-by-step motion to the bar or frame, and a continuously-rotating shaft and connecting means for imparting motion to the cam-wheel.

4. In combination with shaft F, having a feathered sleeve G, a second shaft provided with a gear-wheel $d$ to be engaged by the sleeve and with a wheel H, having peripheral cams $f$, a rack-bar I, provided with a cam groove or slot $l$ and with teeth $e$, to be engaged by the cams $f$, forks J, carrying the needles and provided each with a stud $k$ to enter the slot or groove $l$, and cams for actuating the needles.

5. In combination with the needles and their actuating-cams, an arm or bracket carried by the cam-frame, and a latch-closer mounted upon the bracket or arm.

6. In combination with the needles and their actuating-cams, an arm or bracket pivoted to the cam-frame, and a latch-closer carried by the bracket.

7. In combination with the needles and their actuating-cams, an arm or bracket secured to the cam-frame, and a rotatable latch-closer carried by the bracket.

8. A latch or hook closer comprising a flanged wheel, as N.

9. A latch or hook closer comprising a wheel having a notched flange.

10. A rotatable latch or hook closer, in combination with means, substantially as described, for automatically changing its position at any desired point.

11. A rotatable latch or hook closer, in combination with a rack-bar and pinion and with means substantially such as shown for moving said rack-bar to bring the latch-closer into and out of action or to change the relative position of the notches upon its flanges as regards certain needles.

12. A rotatable latch or hook closer, in combination with a gear-wheel on the shaft thereof, a normally-fixed rack-bar with which said gear-wheel engages, and a cam device for reciprocating said rack-bar to bring the latch or hook closer into and out of action automatically or to change the relative position of its pattern edge as regards certain needles.

13. In combination with rack-bar O, having downwardly-turned end or arm $n$, a cam-wheel P, provided with peripheral cams $o$ to engage the arm $n$, a shaft F, provided with a feather-sleeve $p$ to engage a gear $q$, secured to wheel P, a traveling frame provided with a bracket, a shaft journaled therein and provided with latch-closer N and with a gear-wheel M to engage the rack-bar, and means for imparting motion to the traveling frame and the shaft F.

14. In combination with a latch-opener substantially such as shown, a spring-plate R'.

15. In combination with a latch-opener, a spring-plate R', provided with ribs $R^2$.

16. In combination with the needles and their actuating-cams, mechanism for raising and lowering the needles into and out of position to be acted upon by their cams, a rotatable latch-closer, mechanism for bringing the latch-closer into and out of action, a shaft, and intermediate mechanism, substantially such as shown, for imparting an intermittent motion to the devices for raising and lowering the needles and throwing the latch-closer into and out of action or for changing the relative position of the notches on its face as regards certain needles.

17. A rotatable latch or hook closer, in combination with a gear-wheel on the shaft thereof and a rack-bar with which said gear-wheel engages, substantially as shown.

In witness whereof we hereunto set our hands in the presence of two witnesses.

STEPHEN B. LEWIS.
FRANKLIN F. LEWIS.

Witnesses:
W. S. FLAGLER,
SILAS HAYNER.